United States Patent [19]

Iwami

[11] Patent Number: 5,546,458
[45] Date of Patent: Aug. 13, 1996

[54] HANDSFREE COMMUNICATION APPARATUS

[75] Inventor: Akiko Iwami, Amagasaki, Japan

[73] Assignee: Mitsubishi Denki Kabushiki Kaisha, Tokyo, Japan

[21] Appl. No.: 397,835

[22] Filed: Mar. 2, 1995

[30] Foreign Application Priority Data

May 18, 1994 [JP] Japan ................................. 6-104057

[51] Int. Cl.⁶ ................................................ H04M 1/00
[52] U.S. Cl. ........................ 379/390; 379/387; 379/395; 379/419; 381/92; 381/94
[58] Field of Search ..................... 379/390, 387, 379/395, 419, 433, 58, 57; 381/92, 94

[56] References Cited

U.S. PATENT DOCUMENTS

| 5,379,338 | 1/1995 | Umemoto et al. | 379/58 |
| 5,381,473 | 1/1995 | Andrea et al. | 379/395 |
| 5,384,843 | 1/1995 | Masuda et al. | 379/390 |

FOREIGN PATENT DOCUMENTS

| 0557166 | 8/1993 | European Pat. Off. . |
| 0624046 | 11/1994 | European Pat. Off. . |
| 1114245 | 5/1989 | Japan . |
| 221997 | 2/1990 | Japan . |
| 7900046 | 2/1979 | WIPO . |
| 8501411 | 3/1985 | WIPO . |

Primary Examiner—Jeffery Hofsass
Assistant Examiner—Jacques M. Saint-Surin
Attorney, Agent, or Firm—Rothwell, Figg, Ernst & Kurz

[57] ABSTRACT

A handsfree communication apparatus utilizing a plurality of microphones to allow simultaneous communication by a plurality of persons. The plurality of microphones are separately provided apart from one another. An amplifier section (or a noise canceller) includes a plurality of operational amplifiers for signal amplification individually corresponding to the plurality of microphones, and differential amplifier circuit for executing a differential amplification. Through the differential amplification, simultaneously input noise components are canceled out and reduced, and at the same time speech components are extracted.

8 Claims, 5 Drawing Sheets

5,546,458

HANDSFREE COMMUNICATION APPARATUS

BACKGROUND OF THE INVENTION

1. Field of the Invention

The present invention relates generally to a handsfree communication apparatus intended to be connected to a wireless telephone set, and more particularly to a handsfree communication apparatus utilizing a plurality of microphones to enable a plurality of persons to simultaneously communicate with one another.

2. Description of the Related Art

A handsfree communication apparatus for a wireless telephone set conveniently allows communication without requiring the use of both of a user's hands, and mainly comprises a handsfree adapter, a microphone, and a loudspeaker. In the case of loading into a vehicle, the handsfree adapter is connected to the wireless telephone set lying within the vehicle, while the microphone and the loudspeaker associated with the handsfree adapter are firmly secured to predetermined points within the vehicle. This configuration will ensure that a person (such as a driver) within the vehicle is capable of transmitting speech by means of the microphone of the handsfree communication apparatus instead of a microphone of the wireless telephone set and receiving speech of the other party by use of the speaker of the handsfree communication apparatus in place of a loudspeaker of the wireless telephone set. In other words, this will enable the user to communicate with the other party without actually picking up the wireless telephone set.

Referring to FIG. 7, there is depicted, by way of example, a conventional handsfree communication apparatus. The handsfree communication apparatus generally designated at 100 is connected to a wireless telephone set 11. The apparatus 100 comprises a handsfree adapter 10, a microphone 12, and a loudspeaker 18. The handsfree adapter 10 includes an amplifier section 14 and a control section 16.

FIG. 8 depicts part of a circuit of the amplifier section 14 in which an indispensable or central constituent element is an operational amplifier 18. A signal (an voice signal) fed to an input terminal 20 is supplied via a resistor 22 to an inverting input terminal (−) of the operational amplifier 18. A constant-voltage power supply 24 is coupled to a non-inverting input terminal (+) of the operational amplifier 18. The thus amplified signal is provided through an output terminal 26. Reference numeral 28 denotes a feedback resistor.

In the configuration of FIG. 7, in the reception mode, a signal received by the wireless telephone set 11 is output through a receiving terminal 11a, subjected to a level regulation (a volume regulation) in the control section 16, and amplified in the amplifier section 14, and then sent to the loudspeaker 18 for speech conversion. In the transmission mode, an voice signal from the microphone 12 is amplified in the amplifier section 14, subjected to processing such as level regulation in the control section 16, and then fed to a transmitting terminal 11b. Then, a radio transmission is executed by the wireless telephone set 11.

However, the above-described conventional handsfree communication apparatus merely possesses a single microphone and a single loudspeaker, so that when two or more persons wished to take part in a simultaneous communication in the same vehicle, the plurality of persons had to speak into the single microphone 12. In addition, if the persons were sitting apart from each other, for example, in the front and back seats, the simultaneous communication was difficult to carry out.

On the contrary, the microphone receives not only speech but also noise (such as ambient noise, aliasing noise, and vehicular noise) having substantially the same level as that of the speech, whereupon the noise will be mixed into the voice signal, making the speech almost inaudible to the other party.

Japanese Patent Laid-open Pub. No. 114245/1989 discloses a handsfree communication apparatus equipped with a plurality of microphones, but is silent on noise cancellation. Japanese Utility Model Laid-open Pub. No. 21997/1990 discloses a handsfree communication apparatus intended to be mounted on a vehicle, in which a couple of microphones are accommodated in the same case, preventing persons sitting separately, for example, in the front and back seats, from taking part in simultaneous handsfree communication.

SUMMARY OF THE INVENTION

The present invention was conceived to overcome the above problems involved in the prior art. It is therefore an object of the present invention to allow simultaneous communication by a plurality of persons positioned apart from one another.

Another object of the present invention is to reduce the noise other than speech.

A further object of the present invention is to provide a handsfree adapter capable of reducing the vehicular noise other than speech so as to ensure a pleasant communication by a plurality of persons within a vehicle.

In order to accomplish the above objects, a handsfree communication apparatus of the present invention comprises a plurality of microphones individually provided apart from one another; a plurality of amplifiers for each amplifying output signals from the plurality of microphones; and a speech extraction circuit for receiving output signals from the plurality of amplifiers to cancel out common signal components and extract different signal components among the output signals.

According to the above configuration, the microphones are individually arranged apart from one another so as to allow simultaneous communication by a plurality of persons. Output signals from the microphones are amplified in the amplifiers and then subjected to a differential operation between the respective signals in the speech extracting circuit. In this instance, between the output signals from the respective microphones, speech components of respective persons are not coincident with one another due to their difference in speech level, whereas noise components are coincident with one another as long as the noise sources are identical. Consequently, it is possible, through the differential amplification to extract only the speech signals and to cancel out the noise. In other words, the differential ential amplification can be utilized to perform speech extraction and noise cancellation. The ambient noise generated from the entire body of a vehicle, in particular, will simultaneously enter the plurality of microphones, whereupon the noise components can be effectively canceled out or reduced by the differential amplification.

In the preferred embodiments of the present invention, the amplifiers are comprised of operational amplifiers each executing a signal amplification. On the other hand, the differential amplifier is comprised of an operational amplifier for executing differential amplification between output signals from the respective amplifier circuits.

It will be appreciated that the differential amplifier circuit consists of one or a plurality of operational amplifiers depending on the number "n" of microphones. More specifically, the number of differential type operational amplifiers is equal to n−1. In the case of using, for example, two microphones, respective output signals are fed to two input terminals of a single differential type operational amplifier. For the use of three or more microphones, a plurality of operational amplifiers may be connected with one another in a staged manner (in a tournament arrangement) to constitute a differential amplifier circuit.

Also, a switch section may be provided to individually change over the actions of the respective microphones, thereby reducing unwanted sounds to heighten the articulation.

DESCRIPTION OF THE PREFERRED EMBODIMENTS

Figure 1:
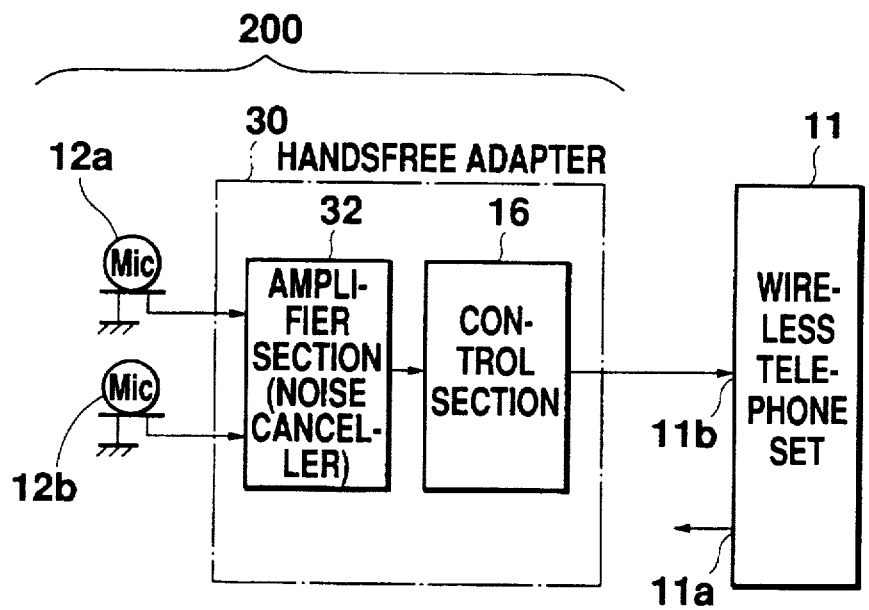
FIG. 1 is a diagram showing a configuration of a first embodiment of the present invention.

Referring first to FIG. 1, there is depicted an overall configuration of a handsfree communication apparatus in accordance with a first embodiment of the present invention. In this embodiment, the apparatus is designed to be loaded into a vehicle to allow simultaneous communication by a plurality of persons.

In FIG. 1, the handsfree communication apparatus generally designated at 200 comprises a handsfree adapter 30, two microphones 12a and 12b, and one or a plurality of loudspeakers (not shown). In this embodiment, the two microphones 12a and 12b independently provided apart from each other are connected via cables to the handsfree adapter 30. The handsfree adapter 30 includes an amplifier section (a noise canceller or a speech extracting section) 32, and a control section 16 for regulating the volume (speech level).

It is to be appreciated that a receive signal from a wireless telephone set 11, in the same manner as the prior art, is subjected to level regulation in the control section 16, and amplified in the amplifier section 32, and then reproduced as speech through the loudspeaker(s) not shown.

Figure 2:
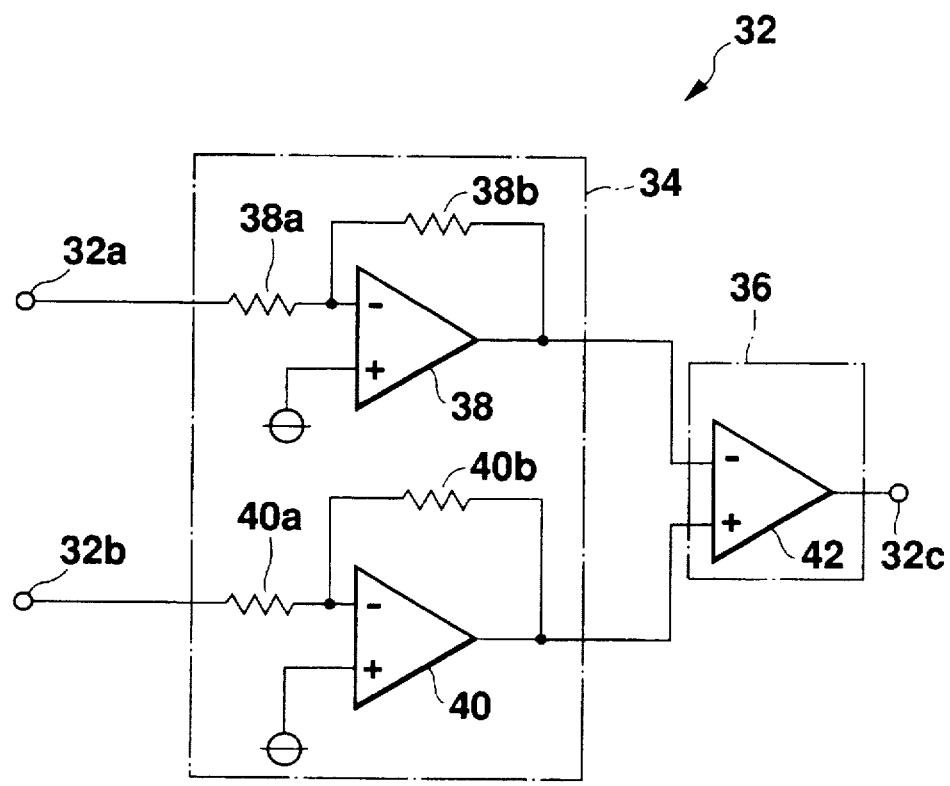
FIG. 2 is a circuit diagram an amplifier section (or noise canceller serving as a speech extracting section) of the first embodiment.

A concrete configuration of the amplifier section 32 is shown in FIG. 2. The amplifier section 32 includes an amplifier circuit 34 consisting of two operational amplifiers 38 and 40, and a differential amplifier circuit 36 consisting of an operational amplifier 42. Output signals of the microphones 12a and 12b are respectively delivered via input terminals 32a and 32b to inverting input terminals (−) of the operational amplifiers 38 and 40 and are amplified therein in the conventional manner.

In this embodiment, output signals of the operational amplifiers 38 and 40 are provided to two input terminals (an inverting input terminal (−), and a non-inverting input terminal (+)) of the operational amplifier 42, and are subjected to differential amplification. This differential amplification serves to cancel out signal components of the same level.

More specifically, the differential amplification will ensure that aural components, of signals from the respective microphones are combined since they are not fundamentally coincident in level with each other, to emerge at an output terminal 32c for transmission to the wireless telephone set 11. On the contrary, components of the vehicular noise and the like are mutually canceled out and reduced due to their coincidence in phase. As a result, the voice signal will be heard clearly by the other party. It is to be noted that the amplification factor of the amplifier circuit 34 can be regulated depending on the magnitudes of resistors 38a, 38b, and resistors 40a and 40b.

In the first embodiment, as described above, two microphones are arranged separate from each other so as to allow simultaneous communication by a plurality of persons in the same vehicles and to utilize the separate arrangement for canceling the noise components while maintaining the speech components by virtue of the differential amplification. For example, one of the two microphones may be disposed on the driver's seat, and the other on the passenger seat. Preferably, one is disposed on the front seat and the other on the back seat.

A second embodiment of the present invention will now be described with reference to FIG. 3.

Figure 3:
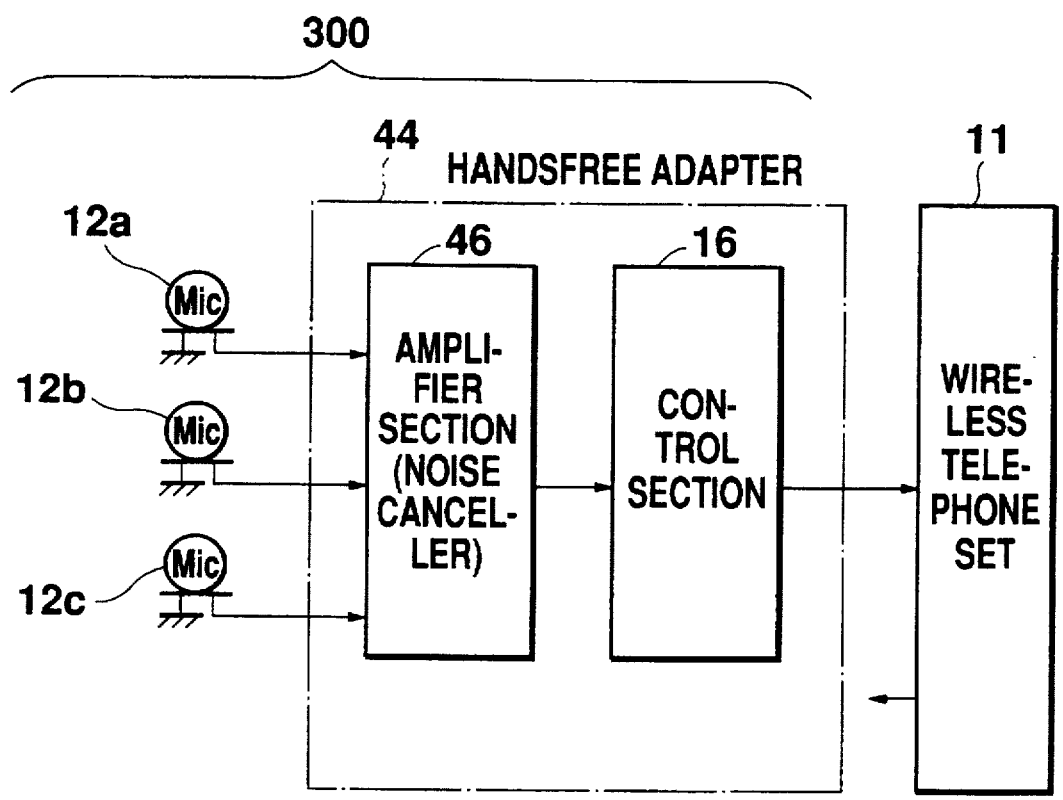
FIG. 3 is a diagram showing a configuration of a second embodiment of the present invention.

Depicted in FIG. 3 is a handsfree communication apparatus generally designated at 300. Although two microphones are connected to the handsfree adapter in the first embodiment, three microphones 12a, 12b, and 12c are connected to an amplifier section 46 within a handsfree adapter 44 in the second embodiment. Similarly to the amplifier section 32 of the first embodiment, the amplifier section 46 includes a plurality of operational amplifiers for amplifying signals from the microphones, and a plurality of operational amplifiers for executing differential amplification between output signals from the plurality of amplifiers. The amplifier section 46 performs speech extraction as well as noise cancellation. A control section 16 has substantially the same function as that of the control section 16 of FIG. 1.

Figure 4:
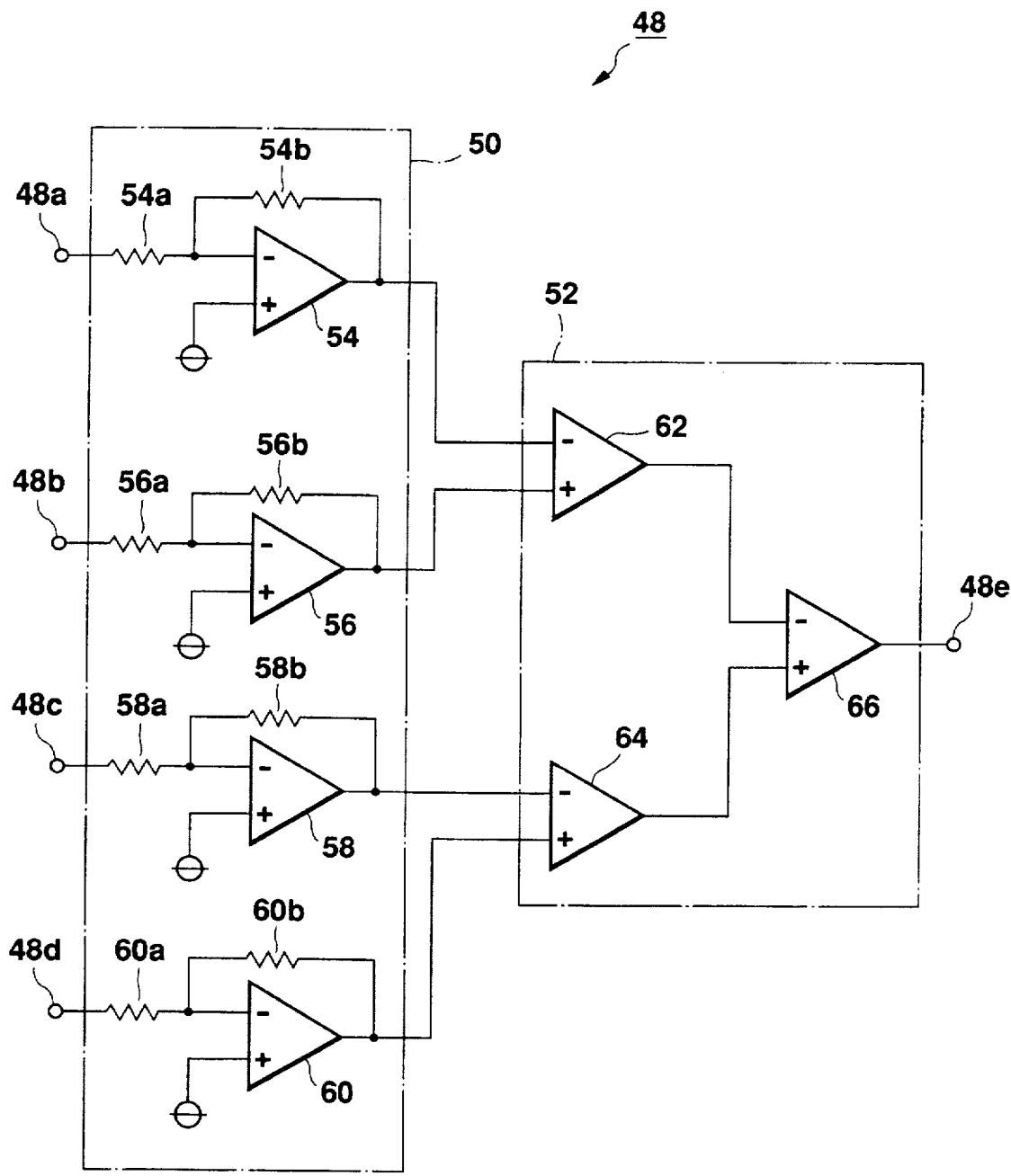
FIG. 4 is a circuit diagram of another amplifier section (or noise canceller serving as a speech extracting section).

Referring next to FIG. 4, there is illustrated a circuit configuration of an amplifier section 48 to which four microphones are connected. The amplifier section 48 includes an amplifier circuit 50 consisting of operational amplifiers 54, 56, 58, and 60 equal in number to microphones connectable thereto, and a differential amplifier circuit 52 for executing differential amplification between output signals from the amplifier circuit 50.

Input terminals 48a, 48b, 48c and 48d receive output signals from corresponding microphones. The signals from the input terminals 48a, 48b, 48c and 48d are amplified, in the same manner as above, by the operational amplifiers 54, 56, 58 and 60 and are sent to the differential amplifier circuit 52. The differential amplifier circuit 52 consists of three operational amplifiers 62, 64 and 66. The operational amplifiers 62 and 64 of the first stage each execute differential amplification for signals from the respective two microphones associated therewith. The operational amplifier 66 of the second stage executes differential amplification for output signals from the two operational amplifiers 62 and 64.

According to such a circuit configuration, the combination of four different signals will contribute to a cancellation and reduction of noise which has been simultaneously input through the plurality of microphones, allowing the speech components to be extracted from an output terminal 48e.

It will be appreciated that the amplification degrees for respective signals can be controlled by regulating the values of resistors 54a and 54b, resistors 56a and 56b, resistors 58a and 58b, and resistors 60a and 60b.

As described hereinabove, the number of operational amplifiers has only to be increased to cope with three or more microphones. As shown in FIG. 4, the differential amplifier circuit can be comprised of a plurality of differential amplification type operational amplifiers connected in the tournament arrangement. In this case, the number of differential amplification type operational amplifiers is equal to (the number of microphones −1). It is to be noted that both the amplifier circuit 50 and the differential amplifier circuit 52 can be constituted of the same type of operational amplifiers and that the use of the same type of operational amplifiers would contribute to a reduction in the production cost.

Description will now be given of a third embodiment of the present invention.

Figure 5:
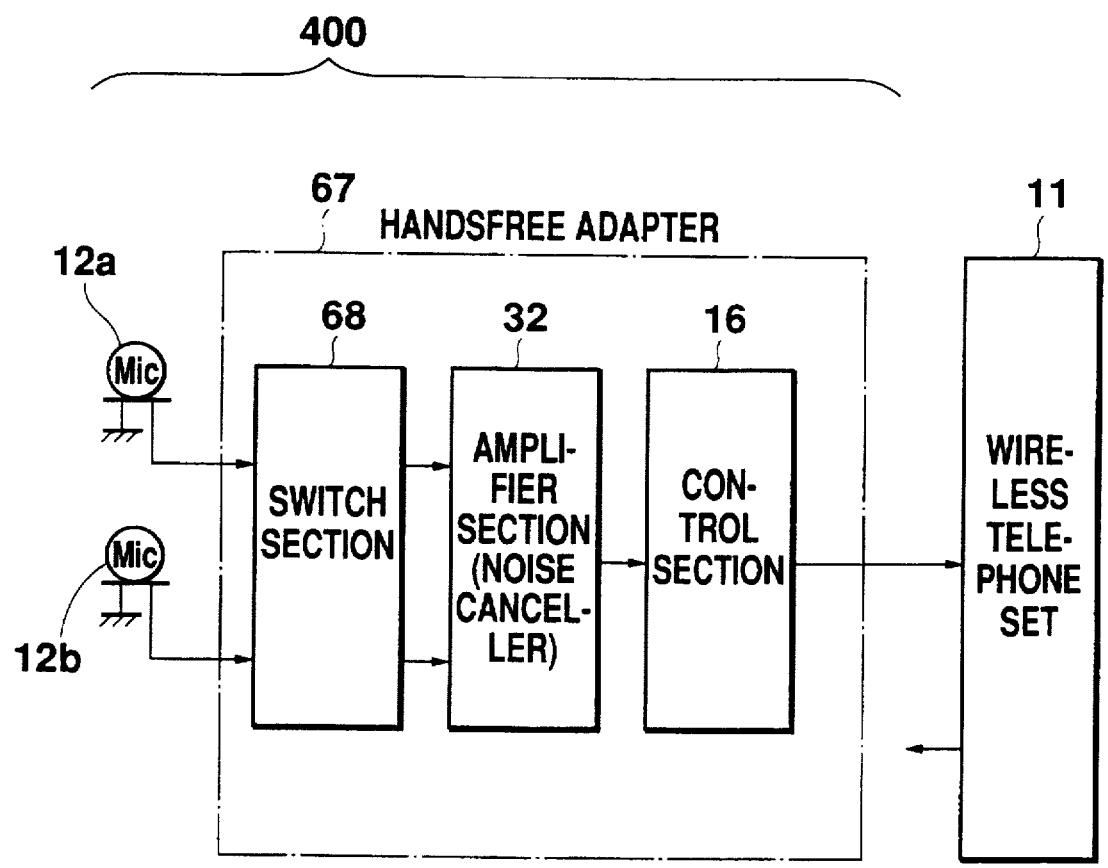
FIG. 5 is a diagram showing a configuration of a third embodiment of the present invention.

Referring to FIG. 5, there is illustrated a configuration of the third embodiment, in which a handsfree communication apparatus generally designated at 400 includes a handsfree adapter 67 having a switch section 68 interposed between handsfree adapter 67 having a switch section 68 interposed between microphones 12a and 12b and an amplifier section 32. The switch section 68 acts to switch individually the microphones on or off, and is automatically or manually operated. A control section 16 and the amplifier section 32 have the same configurations as those of the control section 16 and the amplifier section 32, respectively, of FIG. 1.

Figure 6:
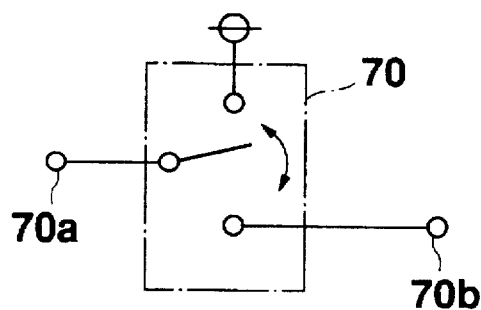
FIG. 6 illustrates a principal part of a switch section.
Figure 7:
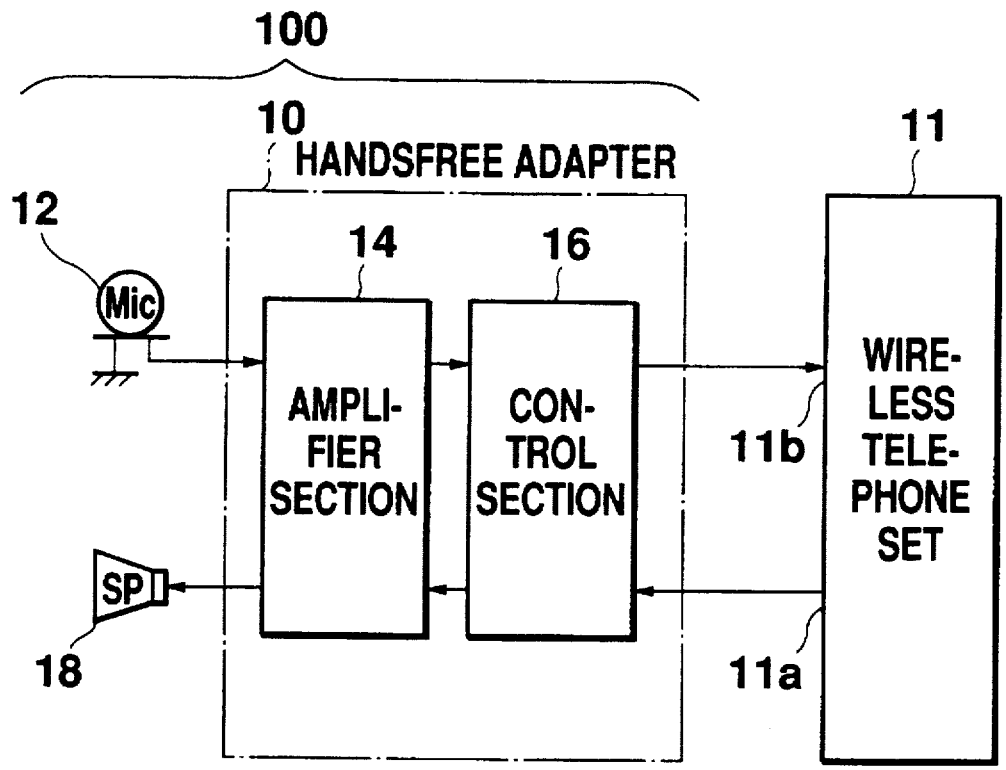
FIG. 7 depicts a conventional handsfree communication apparatus.
Figure 8:
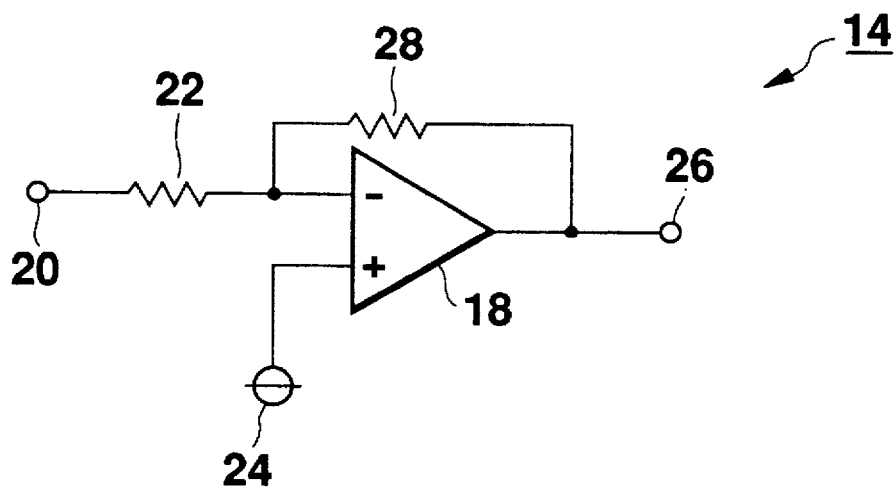
FIG. 8 is a partial circuit diagram of a conventional amplifier section.

A configuration of a principal part of the switch section 68 is shown in FIG. 6. A switch 70 is provided for each of the microphones. By controllably changing over the switch 70, the user is capable of individually switching the actions of the respective microphones. In FIG. 6, a signal from the microphone is fed to an input terminal 70a, and if the switch 70 is at the ON position, it emerges intact at an output terminal 70b.

Thus, according to the third embodiment, the action of the microphone not required to pickup sound can be switched off to reduce unwanted sounds and therefore to improve the articulation of target speech.

In this manner, according to the embodiments described hereinabove, there is implemented a handsfree communication apparatus allowing simultaneous communication by a plurality of persons positioned apart from one another and enabling noise cancellation. Also, the differential amplifier may be of a simple configuration. Further, the action of the microphone not required to pick-up sound can be switched off.

If the handsfree communication apparatus of the embodiments is installed in a vehicle, in particular, the microphones for the exclusive use of respective persons can be utilized to realize simultaneous communication while reducing the vehicular noise except speech. Within the vehicle, a first microphone may be disposed in front of the driver, and a second microphone may be disposed in front of the passenger seat. Further, the back seat may be provided with a plurality of microphones confronting passengers. The microphones may be of good directivity to improve the articulation of speech.

What is claimed is:

1. A handsfree communication apparatus intended to be connected to a wireless telephone set, comprising:

a plurality of microphones individually provided apart from one another and being spaced apart and positioned with respect to each other for receiving separate speech inputs from different persons for allowing a plurality of persons to take part in simultaneous handsfree communication;

a plurality of amplifiers each for amplifying output signals from said plurality of microphones; and a speech extraction circuit for receiving output signals from said plurality of amplifiers to cancel out common signal components among the output signals.

2. A handsfree communication apparatus according to claim 1, wherein said speech extraction circuit includes differential amplifier for executing a differential amplification between output signals from said plurality of amplifiers.

3. A handsfree communication apparatus according to claim 2, wherein said differential amplifier is comprised of an operational amplifier.

4. A handsfree communication apparatus according to claim 1, wherein said speech extraction circuit includes one or a plurality of operational amplifiers each serving as a differential amplifier, the number of said operational amplifiers depending on the number of said plurality of microphones.

5. A handsfree communication apparatus according to claim 4, wherein said plurality of operational amplifiers are connected with one another in a tournament arrangement, and wherein among said plurality of operational amplifiers, one positioned at the final stage in said tournament arrangement provides as its output a noise-canceled speech signal.

6. A handsfree communication apparatus according to claim 1, further comprising:

a switch section for individually changing over on/off actions of said plurality of microphones.

7. A handsfree communication apparatus intended to be connected to a wireless telephone set installed in a vehicle, said communication apparatus comprising:

a plurality of microphones individually provided apart from one another and being spaced apart and positioned with respect to each other for receiving separate speech inputs from different persons for allowing a plurality of persons to take part in simultaneous handsfree communication;

a plurality of amplifiers each for amplifying output signals from said plurality of microphones; and a speech extraction circuit for inputting output signals from said plurality of amplifiers to cancel out noise components common among the output signals and to extract speech components different among the output signals.

8. A handsfree communication apparatus according to claim 7, wherein said speech extraction circuit includes a differential amplifier for executing differential amplification between output signals from said plurality of amplifiers.

* * * * *